Nov. 25, 1969  J. C. JUREIT  3,479,783
JOINT
Filed Sept. 11, 1967  2 Sheets-Sheet 1
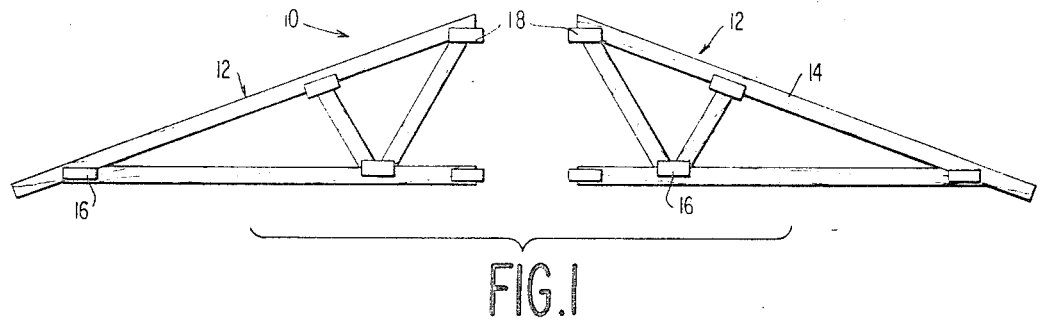
FIG.1
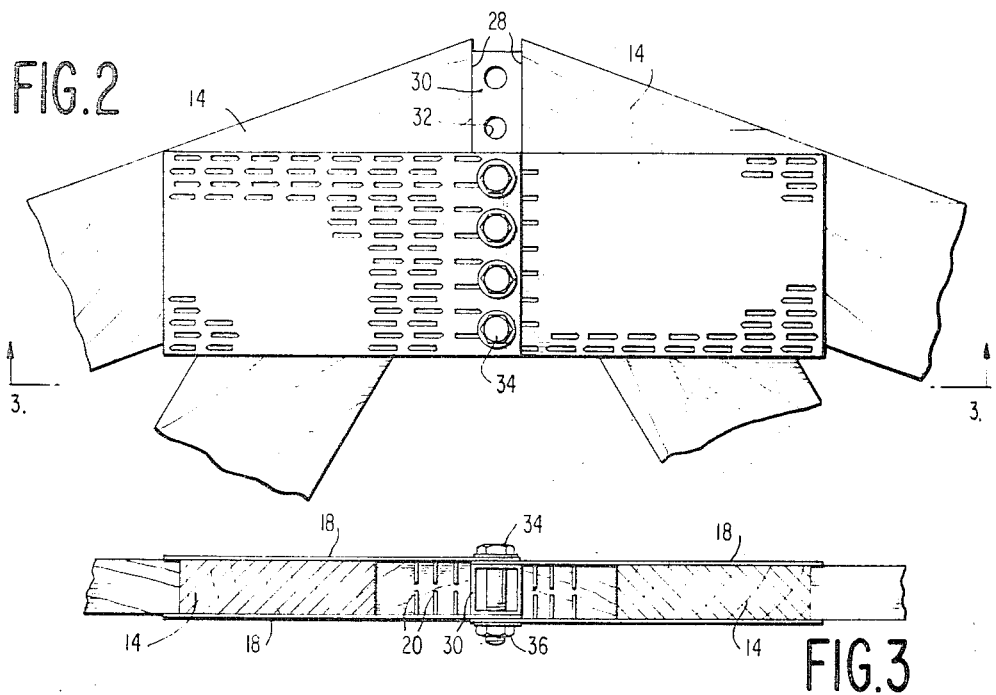
FIG.2
FIG.3
FIG.4
INVENTOR
JOHN C. JUREIT
BY 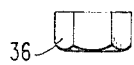
ATTORNEYS Nov. 25, 1969  J. C. JUREIT  3,479,783
JOINT
Filed Sept. 11, 1967  2 Sheets-Sheet 2
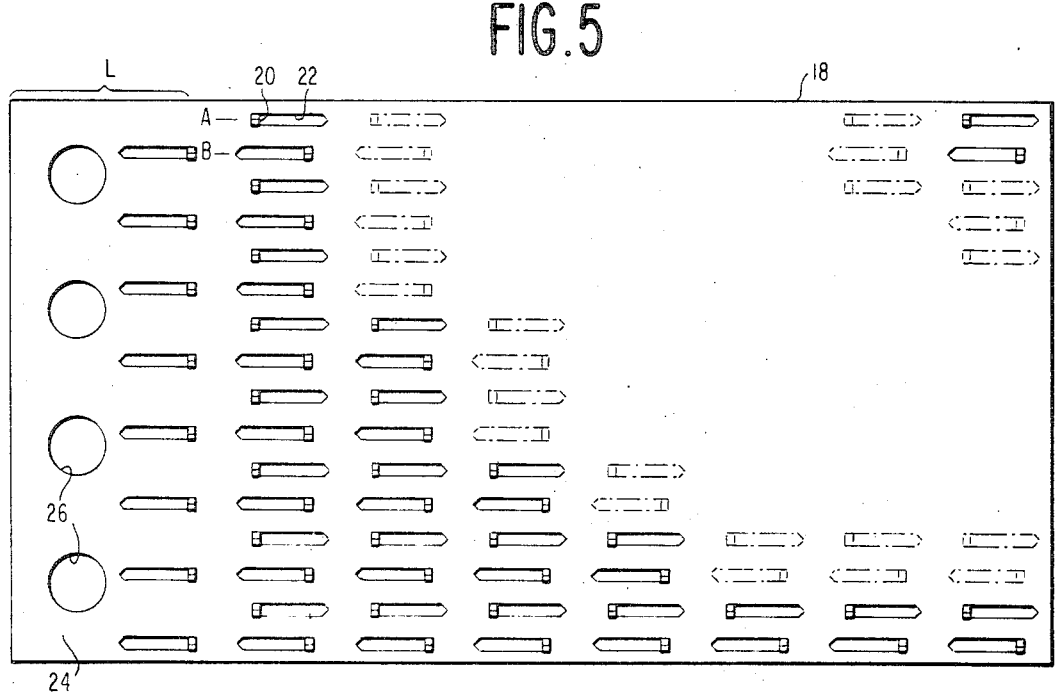
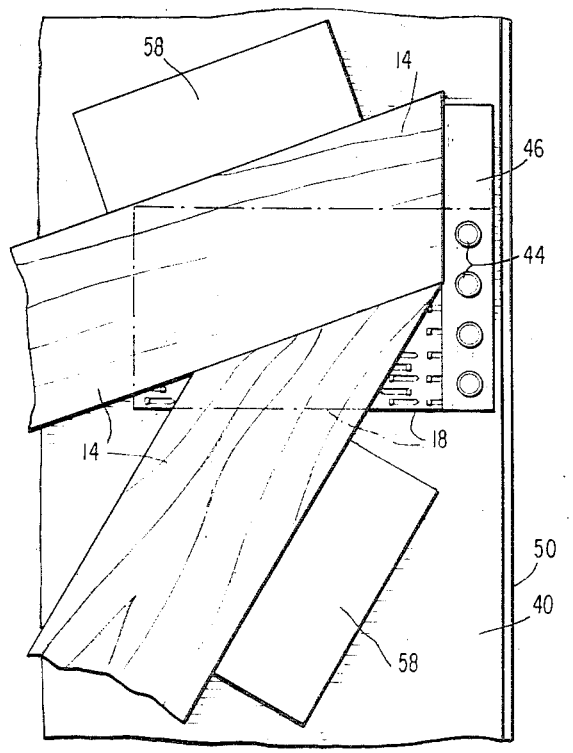
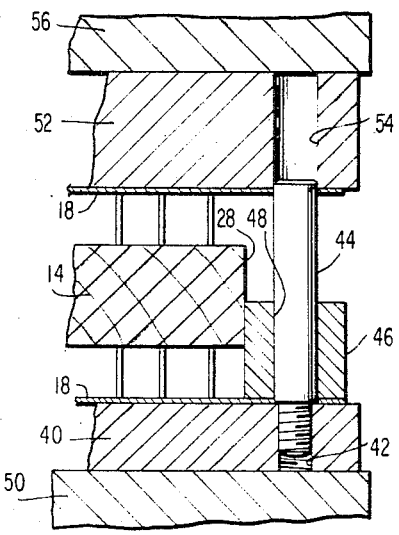
INVENTOR
JOHN C. JUREIT
BY *LeBlanc & Shur*
ATTORNEYS

United States Patent Office 3,479,783
Patented Nov. 25, 1969

3,479,783
JOINT
John Calvin Jureit, Coral Gables, Fla., assignor to Automated Building Components, Inc., Miami, Fla., a corporation of Florida
Filed Sept. 11, 1967, Ser. No. 666,877
Int. Cl. E04c 1/32; E04b 1/38
U.S. Cl. 52—584                                  20 Claims

ABSTRACT OF THE DISCLOSURE

The splice joint comprises connector plates having a plurality of teeth struck to form normally projecting nails distributed over a major portion of the plate, the latter having a planar end portion having openings therethrough, the plates are applied on opposite sides of wooden structural members forming a splice joint by pressing the teeth into the wooden members with the end portions extending beyond the end of the structural member, the joint is formed by providing a reinforcing member between the butt ends of the structural members and aligning the openings in the end portions of the plates and openings through the reinforcing member whereby bolts inserted through such openings align and secure the structural members in assembled relation, and a wooden structural member having such plates may also be attached thereby to suitable anchoring brackets or fittings.

BACKGROUND OF THE INVENTION

The present invention relates to wooden structural joints and more particularly to splice joints for wooden trusses, connector plates therefor and a method of applying the connector plates to the wooden structural members.

It is current practice in the wooden building industry to prefabricate roof and floor trusses, as well as other wooden structural members, at the factory and transport the same to the job site for assembly, rather than to employ more conventional methods of wooden framing construction at the job site. In present practice, wooden structural members are cut, assembled on jigs and secured together by pressing connector plates of the type having integrally struck teeth, such as disclosed, for instance, in U.S. Patents Nos. 2,877,520 and 3,016,586, into the various joints, thereby forming a prefabricated truss. The trusses are usually loaded on trucks or the like for transportation to the job site and there assembled to form a completed building structure. In this manner, not only is the more costly and conventional assembly of the individual trusses, as by hand nailing at the job site, avoided, but the prefabricated trusses are usually more accurately cut, thereby simplifying assembly of the truss and the truss structure, as well as forming a stronger truss capable of withstanding structural loading far in excess of conventional wooden framing. However, the bulkiness, unwieldiness and weight of larger prefabricated trusses have caused problems in their transportation and final assembly at the job site to the extent that it is economically not feasible and practically impossible to transport larger prefabricated trusses, for example, on the order of 60 feet or longer, and to accurately and efficiently assemble the trusses at the job site to form a completed building structure.

It is both structurally and economically desirable, however, that trusses of this type be prefabricated, particularly in view of the stronger and more reliable truss joints thus formed by employing connector plates of the aforementioned type. The formation of prefabricated truss sections at the factory and the field assembly thereof at the job site, for example, to form a complete roof or truss structure, is the most efficient, practical and economical method of forming wooden building structures and is therefore an extremely desirable building method. However, the large presses usually used to embed heavy gauge steel connector plates (14 gauge being common) into the wooden structural members (often 2 x 6 and 2 x 8) are not available in the field. Moreover, and most importantly, the larger trusses are difficult, if not impossible, to economically transport to the job site, and proper alignment of the truss sections, one with the other, in the field, is very difficult and time consuming.

SUMMARY OF THE INVENTION

The wooden structural splice joint of the present invention employs connector plates of the type having slender, elongated, nail-like teeth struck therefrom, the plates being formed and applied to wooden structural members such that a field splice between such members can be readily and easily effected, thus accruing all of the advantages of this type of connector plate to the spliced truss. Accordingly, to employ the structural joint hereinafter described and illustrated, truss sections, which may be assembled at the job site to form a completed truss, may be prefabricated at the factory with the connector plates constructed in accordance with the present invention being applied as by pressing the same into the ends of the wooden structural members which will form the adjoining members of the splice joint. Each connector plate hereof has a plurality of slender, nail-like teeth struck from a major portion of the area thereof and is provided with a plurality of openings through an instruck end portion, the teeth thus being spaced from the end portion such as to leave the same planar in form. The plates are positioned at the truss fabrication plant along opposite sides of each of the structural splice members ready for embedment with the end portions extending beyond the ends of the splice members. A guide pin inserted through corresponding registering openings through the plates maintains the same in proper alignment on each structural member as the teeth are embedded into opposite sides thereof by the factory presses.

The truss sections, being of reduced length and bulk, can then be easily transported to the job site and readily assembled by overlapping the end portions of the connector plates of the corresponding structural members and aligning the corresponding openings. A tubular reinforcing member having corresponding openings is disposed between the butt ends of the structural members and the assembly is bolted together to form the splice joint. Proper truss alignment in the field is thus assured by the aligment of the corresponding openings in the connector plates. While the invention finds its greatest utility in splice joints, it is also highly advantageous in anchoring the ends of structural wooden members to anchor brackets or other supports.

Accordingly, it is a primary object of the present invention to provide a splice joint for wooden structural members formed employing connector plates having teeth struck therefrom which can be rapidly and readily assembled in the field.

It is another object of the present invention to provide a joint for joining wooden truss sections which provides for simple and accurate field alignment of the truss sections.

It is still another object of the present invention to provide a splice joint for wooden structural members formed employing connector plates of the type having teeth struck therefrom which permits the economical formation of a completed wooden truss structure in the field, whereby the truss sections thereof can be factory prefabricated, transported to the job site, and there efficiently assembled to form a completed truss structure.

It is yet a further object of the present invention to provide a method of applying connector plates of the type having nail-like teeth struck therefrom to opposite sides of wooden structural members forming truss sections, whereby the connector plates on each structural member can be accurately and factory aligned for efficient assembly in the field.

It is still a further object of the present invention to provide a joint for anchoring the ends of wooden structural members to anchor brackets or the like employing connector plates having teeth struck therefrom.

These and further objects and advantages of the invention will become apparent upon reference to the following specification, claims, and appended drawings, wherein:

DESCRIPTION OF THE DRAWINGS

FIGURE 1 is an elevational view of a truss illustrating prefabricated truss sections ready for field assembly;

FIGURE 2 is a fragmentary enlarged elevational view of the peak joint of a roof truss formed with a split joint constructed in accordance with the present invention;

FIGURE 3 is a sectional view thereof taken about on line 3—3 of FIGURE 2;

FIGURE 4 is an enlarged exploded view thereof similar to FIGURE 3 showing the parts of the splice joint in disassembly;

FIGURE 5 is an enlarged elevational view illustrating the connector plate of the present invention;

FIGURE 6 is a fragmentary cross sectional view illustrating the application and alignment of the connector plates at the factory to a structural member forming a portion of the splice joint; and FIGURE 7 is a fragmentary plan view thereof.

DESCRIPTION OF THE PREFERRED EMBODIMENT

Referring to FIGURE 1, there is shown a structural load-bearing truss, generally designated 10, prefabricated to form a pair of truss sections 12, the structural members 14 of which are assembled at the factory by connector plates 16 which may be of the type described and illustrated in the aforementioned U.S. Patents Nos. 2,877,520 or 3,016,586. While a roof truss is herein illustrated, it will be understood that splice joints constructed in accordance with the present invention, an embodiment of which is illustrated in FIGURES 2 and 3, may be applied to other types of trusses and other structural load-bearing members.

As best seen in FIGURE 5, the splice connector plates 18, employed with the splice joint of the present invention, each comprise a mild steel plate having struck therefrom a plurality of rows of slender, elongated, nail-like teeth 20 which leave longitudinal rows of elongated slots 22. Teeth 20 are integrally struck for distribution over a major portion of the area of plate 18 and are arranged such that the teeth in adjacent longitudinal rows, such as rows A and B, are struck in opposite directions, whereby the slots 22 left thereby extend from the teeth in opposite longitudinal directions. Teeth 20 are struck to terminate in pointed ends or tips, not shown, for embedment in structural members 14 in any suitable manner, preferably by the application of pressure to plate 18 by a suitable press. It is thus seen that the arrangement and configuration of teeth 20 may be generally similar to the teeth illustrated in the aforementioned U.S. patents, although it will be understood that other arrangements and configurations thereof may be employed without departing from the scope of this invention.

As seen in FIGURES 2 and 5, an end portion 24 of plate 18 is provided with a plurality of transversely spaced openings 26. Note that the teeth 20 struck from the transverse row next adjacent openings 26 project from the ends of slots 22 which are remotely spaced from openings 26 such that end portion 24 is planar in form for a length L indicated in FIGURE 5. The preferred embodiment of connector plate 18 has a planar end portion which extends longitudinally a distance approximately equal to 16% of the total length of plate 18 in order to provide a sufficient number of teeth, thereby to insure a rigid and strong joint with the wooden structural member. It will be appreciated, however, that the length of end portion 24 may be extended to accommodate bolt holes spaced further away from the end of member 14 as may be necessary in other types of connections. Moreover, with the foregoing configuration, end portions 24 of connector 18, when applied to truss sections 12, can overlap one another as seen in FIGURE 3 without the teeth 20 of the oppositely disposed plates interfering in the overlapping relation.

Splice connector plates 18 are applied, in a manner as will presently appear, to opposite side faces adjacent the ends of each of the structural members 14 which will form the splice joint, such that end portions 24 thereof project beyond the butt ends 28 of structural members 24 as best seen in FIGURE 2. Thus, the teeth which are distributed throughout the major portion of the surface of plates 18 are substantially all embedded in the structural members 14 adjoining the splice joint, leaving only planar end portions 24 of plates 18 to project beyond butt end 28.

A tubular reinforcing member 30 is provided to complete the splice joint and comprises a steel tube having preferably a substantially square cross section as seen in FIGURE 3 and a plurality of openings 32 through opposite side faces thereof. The longitudinal spacing of openings 32 along tube 30 is such as to correspond to the transverse spacing of openings 26 in end portion 24 of plates 18. Thus, when reinforcing member 30 is disposed between butt ends 28 of structural members 14, openings 26 and 32 may be placed in registry, one with the other, whereby bolts 34 can be inserted through the registering openings and the splice joint finally secured as by nuts 36.

According to a specific preferred embodiment of the splice joint for use with a truss 60 feet and longer, which usually utilizes 2 x 6 wooden structural members, a 14 gauge steel connector plate on the order of 6 by 12 inches and a reinforcing member on the order of 1½ inches square may be utilized. The length of the planar end portion ought to be at least 1½ inches and preferably approximately 2 inches such that the teeth 20 comprising the first transverse row thereof adjacent end portion 24 are spaced in wooden member 14 from the seam between reinforcing member 30 and butt end 28 and sufficient sheet material is provided about openings 26 adjacent slots 22 whereby shearing and distortion of the metal is precluded.

It is a significant feature of the present invention that connector plates 18 can be applied to opposite sides of such structural member 14 which forms an end of the splice joint such that corresponding openings 26 in each oppositely disposed plate 18 are in registry. To this end and referring to FIGURES 6 and 7, a mounting block 40 is provided which has a plurality of transversely spaced vertically extending, preferably threaded openings 42 for receiving the lower threaded ends of a plurality of upstanding guide pins 44. The openings 42 need not be threaded as pins 44 may be slip fitted into openings 42 for fast removal. The transverse spacing between openings 42 is such as to correspond to the spacing between openings 26 in plates 18 whereby a plate 18 may be disposed on mounting block 40 with guide pins 44 extending through the corresponding openings 26 and teeth 20 of plate 18 projecting upwardly as best seen in FIGURE 6. An abutment block 46, having a width corresponding to the width of reinforcing member 30, is provided and has a corresponding number of vertically extending identically spaced openings 48 whereby abutment block 46 can be located on guide pins 44 with end portion 24 of plate 18 disposed between block 46 and mounting block 40. This assembly is located on a press table 50 such that abutment block 46 abuts the end 28 of structural member 14, thus locating openings 26 with respect to member 14 and insuring that reinforcing member 30 abuts end 28 when disposed behind end portion 24 with corresponding openings 26 and 32 in registry one with the other.

To locate the connector plate 18 on the opposite face of member 14 such that corresponding openings 26 in both plates register one with the other, the other plate 18 is placed on member 14 with its teeth projecting downwardly ready for embedment therein and with its openings 26 receiving the corresponding upper ends of guide pins 44. In this manner, the corresponding openings through plates 18 are aligned by guide pins 44 and spaced by abutment block 46 a predetermined distance from the butt end 28 of member 14, whereby end portions 24 of plates 18 on adjacent truss sections may overlap when finally assembled. An upper spacer block 52, having a plurality of vertical bore holes 54 spaced to receive the upper ends of guide pins 44, is located between a press platen 56 and the upper connector plate 18 such that, as the press drives teeth 20 of plates 18 into member 14, the upper ends of pins 44 are received in openings 54. Holes 54 preferably fit loosely about pins 44. In this manner, openings 26 in each plate 18 are maintained in proper alignment one with the other and in predetermined spaced relation from the end of member 14. The guide blocks 58, illustrated in FIGURE 7, maintain members 14 in proper relation during the pressing action in the usual manner. Truss sections 12 are thus prefabricated and the truss connector plates 18 applied thereto at the factory.

After truss sections 12 are transported to a job site, they can be readily and easily assembled to form the completed truss structure 10 and it is significant that truss sections 12 can be accurately aligned merely by locating the truss sections such that corresponding openings in plates 18 register, one with the other. To assemble the truss 10, truss sections 12 are laid end to end with tubular member 30 disposed between butt ends 28 thereof and end portions 24 of plates 18 on like sides of members 14 overlapping one another. As seen in FIGURE 3, the registration of the openings 26 through each of the four plates 18 and the openings 32 through reinforcing member 30 in each of the splice joints assures proper alignment of the truss sections. In practice, a drift pin, not shown, is first inserted through the registering openings of one of the splice joints and the truss sections then manipulated to align the corresponding openings in the other splice joints, only two splice joints being herein illustrated. After such alignment, bolts 34 are inserted through the registering openings and the truss finally secured as by nuts 36 to form a completed truss assembly.

It will be noted in FIGURES 3 and 4 that when end portions 24 overlap, truss sections 12 are displaced laterally an increment equal to the thickness of a connector plate in order that the overlapping relationship can be provided. This nominal displacement, in most instances, is not critical and may be completely eliminated by laterally displacing the end portions of plates 18 on one of the truss sections as by bending the same outwardly an incremental distance equal to the thickness of plate 18.

The connector plates 18 and reinforcing member 30 may readily be employed to anchor the ends of wooden structural members to anchor brackets, not shown, or other types of support members. For example, member 30 may be riveted to a support member or secured as by angle brackets, not shown, fastened to the adjoining support member. Connector plates 18 can thus be secured to the ends of the wooden structural members, similarly as described previously, and the end portions 24 thereof bolted to member 30, thus anchoring the end of the wooden members to the support member.

In each application of the foregoing joint, high tensile screws may be employed and applied as by torque wrenches to improve the design shear strength of the joint. In this manner, the effective net section of the sheet material about openings 26 can be increased without increasing the actual section about openings 26, thereby to improve and strengthen the shear characteristics of the joint. While the illustrated form of connector plate 18 discloses a single transverse row of slots adjacent end portion 24 and openings 26, it will be appreciated that this row could be entirely eliminated, thereby to further improve the shear strength characteristics of the joint, although to provide the single row of slots and teeth thereof simplifies and thereby provides for the more economical fabrication of the plate per se.

From the foregoing, it is apparent that the objects of the invention are fully accomplished in that there is provided a splice joint for truss sections or other wooden structural members which can be readily and easily assembled in the field. Trusses may thus be prefabricated in sections of reduced length and bulk whereby the truss sections can be easily, economically and efficiently transported to the job site for final assembly. Moreover, the advantages which accrue to trusses formed of wooden structural members joined together by connector plates of the type having nail-like teeth struck therefrom as fully described in the aforementioned United States patents, also accrue to the splice joint hereof, with the additional advantage that the splice joint can be formed in the field far removed from the presses normally required to embed the nail-like teeth into the wooden members. Additionally, the splice joint insures true alignment of the truss sections in the field without recourse to special tools and other time consuming alignment procedures.

The invention may be embodied in other specific forms without departing from the spirit or essential characteristics thereof.

What is claimed and desired to be secured by U.S. Letters Patents is:

1. A splice joint for joining adjacent, substantially coplanar, wooden structural members comprising a pair of flat sheet metal plates, each of said plates having a plurality of teeth struck therefrom and a plurality of openings spaced along an end portion thereof, said teeth being distributed over the major portion of the areas of said plates and spaced from the planar end portions thereof, said plates being arranged for the embedment of their teeth into the coplanar faces of adjacent structural members with the teeth of one of said plates adapted for embedment into one of the structural members and the teeth of the other of said plates adapted for embedment into the other of the structural members such that the end portions of said plates overlap one another with the corresponding openings thereof registering each with the other, means passing through said registering openings for securing said plates in assembled relation; and an elongated reinforcing member having a plurality of openings spaced longitudinally therealong, said reinforcing member extending along one side of said overlapping end portions with its openings in registry with the registering openings through said overlapping end portions, said securing means passing through corresponding openings in said elongated member whereby the latter is connected to said plates in reinforcing relation therewith.

2. A splice joint for joining adjacent, substantially coplanar, wooden structural members comprising a pair of flat sheet metal plates, each of said plates having a plurality of teeth struck therefrom and a plurality of openings spaced along an end portion thereof, said teeth being distributed over the major portion of the areas of said plates and spaced from the planar end portions thereof, said plates being arranged for the embedment of their teeth into the coplanar faces of adjacent structural members with the teeth of one of said plates adapted for embedment into one of the structural members and the teeth of the other of said plates adapted for embedment into the other of the structural members such that the end portions of said plates overlap one another with the corresponding openings thereof registering each with the other, means passing through said registering openings for securing said plates in assembled relation; a second pair of sheet metal plates, each of said second pair of plates having a plurality of teeth struck therefrom and a plurality of openings spaced along an end portion thereof, said latter teeth being distributed over the major portions of said second pair of plates and spaced from the end portions thereof, said latter pair of plates being arranged for the embedment of their associated teeth into the opposite coplanar faces of the adjacent structural members with the teeth of one of said pair of plates adapted for embedment into one of the structural members and the teeth of the other of said second pair of plates adapted for embedment into the other of the structural members such that end portions of said second pair of plates overlap one another with the corresponding openings thereof registering each with the other, said openings through said second pair of plates being in lateral registry with corresponding openings through said first pair of plates, said securing means passing through corresponding openings in each of said second pair of plates; and an elongated reinforcing member having a plurality of openings spaced longitudinally therealong, said reinforcing member being located between said overlapping end portions of said pair of plates with the openings thereof in registry with corresponding openings through said overlapping end portions, said securing means including bolts passing through the registering openings of said plates and said elongated member whereby the latter is connected to said plates in reinforcing relation therewith.

3. A joint for bearing a structural load comprising a pair of adjacent, substantially coplanar, wooden structural members, a pair of flat sheet metal plates, each of said plates having a plurality of teeth struck therefrom and a plurality of openings spaced along an end portion thereof, said teeth being distributed over the major portions of the areas of said plates and spaced from the planar end portions thereof, said plates being arranged for embedment of their teeth into coplanar faces of said structural members with the teeth of one of said plates being embedded into one of said structural members and the teeth of the other of said plates being embedded into the other of said structural members such that end portions of said plates overlap one another with corresponding openings thereof registering each with the other; means passing through said registering openings securing said plates together and said wooden structural members in assembled relation; a second pair of sheet metal plates, each of said second pair of plates having a plurality of teeth struck therefrom and a plurality of openings spaced along an end portion thereof, said latter teeth being distributed over the major portion of the areas of said second pair of plates and spaced from the planar end portions thereof, said latter pair of plates being arranged for embedment of their teeth into the other of the substantially coplanar faces of said structural members with the teeth of one of said second pair of plates embedded into one of said structural members and the teeth of the other of said second pair of plates being embedded into the other of said structural members such that end portions of said second pair of plates overlap one another with the corresponding openings thereof registering each with the other, said openings through said second pair of plates being in lateral registry with corresponding openings through said first pair of plates, said securing means passing through corresponding openings through each of said pairs of plates; and an elongated reinforcing member having a plurality of lateral openings spaced therealong, said reinforcing member being located between said overlapping portions of each of said pair of plates with the openings thereof in registry with corresponding openings through said overlapping end portions, the butt ends of said structural members abutting opposite side edges of said reinforcing member, said securing means including bolts passing through the corresponding registering openings of said pairs of plates and said reinforcing member.

4. A structural joint according to claim 3 wherein said teeth are struck in longitudinal rows from each of said plates, the teeth in next adjacent rows being struck in opposite directions whereby the slots left thereby extend from the teeth in opposite longitudinal directions, and wherein the length of said end portions does not exceed 20% of the length of said plates.

5. A splice joint for joining adjacent, substantially coplanar, wooden structural members comprising: a pair of flat sheet metal plates, each of said plates having a plurality of teeth struck therefrom and a plurality of openings spaced along an end portion thereof, said teeth being distributed over the major portion of the areas of said plate and spaced from the planar end portions thereof, said plates being arranged for the embedment of their teeth into opposite side faces of adjacent structural members with the teeth of one of said plates adapted for embedment into one of the structural members and the teeth of the other of said plates adapted for embedment into the other of the structural members such that the end portions of said plates lie in spaced overlapping relation one to the other with the corresponding openings thereof in spaced registry each with the other; means passing through said registering openings for securing said plates in assembled relation; and an elongated reinforcing member having a plurality of openings spaced longitudinally therealong, said reinforcing member extending between said spaced overlapping end portions with its openings in registry with the registering openings through said end portions, said securing means passing through corresponding openings in said elongated member whereby the latter is connected to said plates in reinforcing relation therewith.

6. A joint for bearing a structural load comprising a pair of adjacent, substantially coplanar, wooden structural members, a pair of flat sheet metal plates, each of said plates having a plurality of teeth struck therefrom and a plurality of openings spaced along an edge portion thereof, said teeth being distributed over the major portions of the areas of said plates and spaced from the planar edge portions thereof, said plates being arranged for embedment of their teeth into side faces of said structural members with the teeth of one of said plates being embedded into one of said structural members and the teeth of the other of said plates being embedded into the other of said structural members such that edge portions of said plates lie in substantial lateral registry one with the other with the openings in the one plate lying in substantial lateral registry with corresponding openings in the other plate, reinforcing means lying laterally adjacent the edge portions of said plates and having openings in substantial lateral registry with the laterally registering openings through said plate edge portions, and means passing through said registering openings securing said plates, reinforcing means and said wooden structural members in assembled relation.

7. A structural joint according to claim 6 including a second pair of sheet metal plates, each of said second pair of plates having a plurality of teeth struck therefrom and a plurality of openings spaced along an edge portion thereof, said latter teeth being distributed over the major portion of the areas of said second pair of plates and spaced from the planar edge portions thereof, said latter pair of plates being arranged for embedment of their teeth into the other of the side faces of said structural members with the eteeth of one of said second pair of plates embedded into one of said structural members and the teeth of the other of said second pair of plates being embedded into the other of said structural members such that edge portions of said second pair of plates lie in substantial lateral registry one with the other with the openings in the one plate thereof lying in substantial lateral registry with corresponding openings in the other plate thereof, said openings through said second pair of plates lying in substantial later registry with corresponding openings through said first pair of plates, said securing means passing through corresponding openings through said second pair of plates.

8. A splice joint for joining adjacent, substantially coplanar, wooden structural members comprising a pair of sheet metal plates, each of said plates having a plurality of elongated, nail-like teeth struck therefrom projecting substantially normal thereto and an edge portion free of said projecting teeth, said teeth being distributed over the major portion of the areas of said plates and spaced from said edge portions thereof, said plates being arranged for the embedment of their teeth into the side faces of adjacent structural members with the teeth of one of said plates adapted for embedment into one of the structural members and the teeth of the other of said plates adapted for embedment into the other of the structural members such that the edge portions of said plates lie in substantial lateral registry one with the other, at least one reinforcing member lying laterally adjacent the edge portions of the plates and fastening means cooperating with said plate edge portions and said reinforcing member for securing said plates and reinforcing member in assembled relation.

9. A splice joint according to claim 8 wherein said reinforcing means includes an elongated member having a length at least substantially coextensive with the width of said plates.

10. A splice joint according to claim 8 in combination with said coplanar wooden structural members, the end faces thereof lying in spaced relation one from the other with said reinforcing means disposed therebetween.

11. A splice joint according to claim 8 wherein said teeth comprise slender, elongated, nail-like teeth struck in longitudinal rows in each of said plates, the teeth in next adjacent rows being struck in opposite directions whereby the slots left thereby extend from the teeth in opposite longitudinal direction, and wherein the length of said edge portions does not exceed twenty percent of the length of said plates.

12. A splice joint for joining adjacent, substantially coplanar, wooden structural members comprising a pair of sheet metal plates, each of said plates having a plurality of teeth struck therefrom and at least two openings spaced along an edge portion thereof, said teeth being distributed over the major portion of the areas of said plates and spaced from said edge portions thereof, said plates being arranged for the embedment of their teeth into the side faces of adjacent structural members with the teeth of one of said plates adapted for embedment into one of the structural members and the teeth of the other of said plates adapted for embedment into the other of the structural members such that the edge portions of said plates lie in substantial lateral registry one with the other with the openings in the one plate lying in substantial lateral registry with corresponding openings in the other plate, means passing through said registering openings for securing said plates in assembled relation and reinforcing means lying laterally adjacent the edge portions of said plates and having openings in substantial lateral registry with the laterally-registering openings through said plate edge portions, said securing means passing through the openings in said reinforcing means whereby the latter is connected to said plates in reinforcing relation therewith.

13. A splice joint according to claim 12 wherein said reinforcing means includes an elongated member having a length at least substantially coextensive with the width of said plates.

14. A splice joint according to claim 12 wherein said plates are arranged for the embedment of the teeth into opposite faces of the coplanar wooden members with the plate end portions thereof lying in spaced lateral registry one with the other, said reinforcing means being disposed between said plate edge portions.

15. A splice joint according to claim 12 wherein said plates are arranged for the embedment of their teeth into the coplanar faces of the wooden members with the plate edge portions overlapping one another.

16. A splice joint for joining adjacent, substantially coplanar, wooden structural members comprising a pair of sheet metal plates, each of said plates having a plurality of teeth struck therefrom and at least two openings spaced along an edge portion thereof, said teeth being distributed over the major portion of the areas of said plates and spaced from said edge portions thereof, said plates being arranged for the embedment of their teeth into the side faces of adjacent structural members with the teeth of one of said plates adapted embedment into one of the structural members and the teeth of the other of said plates adapted for embedment into the other of the structural members such that the edge portions of said plates lie in substantial lateral registry one with the other with the openings in the one plate lying in substantial lateral registry with corresponding openings in the other plate, means passing through said registering openings for securing said plates in assembled relation, said pair of plates being arranged for the embedment of their teeth into the coplanar faces of the adjacent structural wooden members, a second pair of sheet metal plates, each of said second pair of plates having a plurality of teeth struck therefrom and a plurality of openings spaced along an edge portion thereof, said latter teeth being distributed over the major portions of said second pair of plates and spaced from the edge portions thereof, said second pair of plates being arranged for the embedment of their associated teeth into the other coplanar faces of the adjacent structural members with the teeth of one of said second pair of plates adapted for embedment into one of the structural members and the teeth of the other of said second pair of plates adapted for embedment into the other of the structural members such that the edge portions of said second pair of plates lie in substantial lateral registry one with the other with the openings in the one plate thereof lying in substantial lateral registry with corresponding openings in the other plate thereof, said openings through said second pair of plates lying in substantial lateral registry with corresponding openings through said first pair of plates, said securing means passing through corresponding openings in said second pair of plates and reinforcing means lying laterally adjacent the edge portions of said plates and having openings in substantial lateral registry with the laterally registering openings through said plate edge portions, said reinforcing means being disposed between the edge plate portions of said first and second pairs of plates, said securing means passing through the openings in said reinforcing means.

17. A joint for bearing a structural load comprising a pair of adjacent structural members, at least one of said members being wooden, a pair of sheet metal plates, each of said plates having a plurality of slender, elongated, nail-like teeth struck therefrom projecting substantially normal thereto and an edge portion free of said projecting teeth, said teeth being distributed over the major portion of the areas of said plates and spaced from said edge portions thereof, each of said edge portions having a plurality of openings spaced therealong, said plates being secured to opposite faces of said one wooden structural member with their teeth being embedded into the one wooden structural member such that the edge portions of said plates project from the wooden structural member with corresponding openings in said edge portions in substantial lateral registry one with the other, at least one reinforcing member lying laterally adjacent the edge portions of said plates, and fastening means for joining said structural members together, said fastening means cooperating with said plate edge openings and said reinforcing member for securing said plates and reinforcing member in assembled relation.

18. A joint for bearing a structural load comprising a pair of adjacent structural members, at least one of said members being wooden, a pair of sheet metal plates having a plurality of slender, elongated nail-like teeth struck therefrom, said teeth being distributed over the major portions of the areas of said plates and spaced from the edge portions thereof, said edge portions being free of said teeth, said plates being secured to opposite faces of said one wooden structural member with their teeth being embedded in the one wooden structural member such that the edge portions of said plates project from said one wooden structural member in substantial lateral registry one with the other, at least one reinforcing member lying laterally adjacent the edge portions of said plates, and means for joining said structural members together including means cooperating with said plate edge portions and said reinforcing member for securing said plates to said reinforcing member in assembled relation.

19. A joint according to claim 18 wherein each of said edge portions has an opening, said reinforcing member having an opening, said plates and said reinforcing member being arranged such that said openings lie in respective lateral registry each with the other, said joining means including an element passing through said registering openings.

20. A splice joint according to claim 18 wherein said edge portions are planar and free of protuberances.

References Cited

UNITED STATES PATENTS

| | | | |
|---|---|---|---|
| 3,178,780 | 4/1965 | Booher | 287—20.92 |
| 3,304,106 | 2/1967 | McCormack | 287—20.92 |
| 3,414,300 | 12/1968 | Spane | 52—673 |

FOREIGN PATENTS 825,163  12/1951  Germany.

FRANK L. ABBOTT, Primary Examiner

S. D. BURKE, III, Assistant Examiner

U.S. Cl. X.R.

52—639; 287—20.92